(12) United States Patent
Nordby, II et al.

(10) Patent No.: US 8,015,917 B1
(45) Date of Patent: *Sep. 13, 2011

(54) FOOD PRODUCT CARRIER

(75) Inventors: David C. Nordby, II, Madison, WI (US); Dennis F. Conohan, Cross Plains, WI (US); Noel R. Johnson, Stoughton, WI (US); Andi J. Mikelsons, Middleton, WI (US); Steve O. Schultz, Pardeeville, WI (US); Jerome P. Lehman, Madison, WI (US); Seth T. Pulsfus, Poynette, WI (US)

(73) Assignee: Alkar-RapidPak-MP Equipment, Inc., Lodi, WI (US)

( * ) Notice: Subject to any disclaimer, the term of this patent is extended or adjusted under 35 U.S.C. 154(b) by 5 days.

This patent is subject to a terminal disclaimer.

(21) Appl. No.: 12/580,296

(22) Filed: Oct. 16, 2009

Related U.S. Application Data

(60) Continuation of application No. 11/971,299, filed on Jan. 9, 2008, which is a division of application No. 10/309,915, filed on Dec. 4, 2002, now Pat. No. 7,325,486.

(51) Int. Cl.
*A21B 1/48* (2006.01)
*A23L 3/18* (2006.01)
*A47J 37/04* (2006.01)
*A47J 37/07* (2006.01)
*B65G 47/26* (2006.01)

(52) U.S. Cl. ............... 99/443 C; 99/443 R; 198/418

(58) Field of Classification Search ............... 99/443 C, 99/443 R, 476, 477, 478, 479; 62/63, 64, 62/375; 198/418, 418.7
See application file for complete search history.

(56) References Cited

U.S. PATENT DOCUMENTS

| | | | | |
|---|---|---|---|---|
| 1,802,294 | A * | 4/1931 | Walker | 99/576 |
| 1,907,894 | A | 5/1933 | Stevens et al. | |
| 2,954,810 | A * | 10/1960 | MacCloygston Bond | 99/574 |
| 3,289,814 | A | 12/1966 | Rosema | |
| 3,533,495 | A | 10/1970 | Wallace | |
| 3,568,816 | A * | 3/1971 | Smith et al. | 198/484.1 |
| 3,575,275 | A * | 4/1971 | Reimers et al. | 198/430 |
| 3,734,269 | A * | 5/1973 | Ross | 198/698 |
| 4,138,860 | A | 2/1979 | Drummond | |
| 4,277,954 | A | 7/1981 | Drummond | |
| 4,329,850 | A | 5/1982 | Drummond | |
| 4,401,018 | A | 8/1983 | Berry | |
| 4,753,216 | A | 6/1988 | Nolte | |
| 4,768,642 | A * | 9/1988 | Hunter | 198/419.2 |
| 4,784,053 | A | 11/1988 | Barnhart | |
| 5,143,199 | A | 9/1992 | Evans | |
| 5,213,196 | A | 5/1993 | Wolf | |
| 5,253,569 | A * | 10/1993 | McFarlane et al. | 99/476 |
| 5,255,596 | A | 10/1993 | Fessmann | |

(Continued)

*Primary Examiner* — Henry Yuen
*Assistant Examiner* — Hemant Mathew
(74) *Attorney, Agent, or Firm* — Andrus, Sceales, Starke & Sawall, LLP (57) ABSTRACT

A food processing system includes a food processing chamber for processing a food product, such as meat products such as hot dogs, sausages, poultry, fish, and other food items. A high speed serial to parallel loading station delivery system is provided. The food product is loaded onto a conveyor in the processing chamber having a plurality of two-piece food product cradles having openings receiving the food product at the loading station and discharging the food product at the unloading station and having gaps between food product carriers distally oppositely spaced from the openings and defining food product cavities therebetween, the width of the openings varying during traversal of the conveyor through the chamber from the loading to the unloading stations.

35 Claims, 10 Drawing Sheets

U.S. PATENT DOCUMENTS

| | | | |
|---|---|---|---|
| 5,271,316 A | 12/1993 | Wisting | |
| 5,282,717 A * | 2/1994 | Lohr et al. | 414/798.2 |
| 5,298,707 A | 3/1994 | Sprecher et al. | |
| 5,339,727 A | 8/1994 | Fessmann | |
| 5,392,698 A | 2/1995 | Sprecher et al. | |
| 5,551,334 A * | 9/1996 | Cody | 99/470 |
| 5,586,642 A * | 12/1996 | Hawkins | 198/803.11 |
| 5,699,723 A | 12/1997 | Schliesser et al. | |
| 5,730,649 A | 3/1998 | Schliesser et al. | |
| 5,755,317 A * | 5/1998 | Holston | 198/484.1 |
| 5,775,517 A * | 7/1998 | Speck | 211/41.1 |
| 5,910,330 A | 6/1999 | Fessmann | |
| 5,924,918 A | 7/1999 | Wagner et al. | |
| 5,927,472 A | 7/1999 | Neef et al. | |
| 6,056,636 A | 5/2000 | Cody et al. | |
| 6,086,469 A | 7/2000 | Cody et al. | |
| 6,179,701 B1 | 1/2001 | Tieleman | |
| 6,257,974 B1 | 7/2001 | Basile, II | |
| 6,382,401 B2 * | 5/2002 | Takemoto et al. | 198/803.11 |
| 6,419,968 B1 | 7/2002 | Wang et al. | |
| 7,325,486 B1 | 2/2008 | Nordby et al. | |
| 2002/0060129 A1 | 5/2002 | Cooper et al. | |

\* cited by examiner

FOOD PRODUCT CARRIER

CROSS REFERENCE TO RELATED APPLICATION

This application is a continuation of U.S. patent application Ser. No. 11/971,299, filed Jan. 9, 2008, which is a division of U.S. patent application Ser. No. 10/309,915, filed Dec. 4, 2002, now U.S. Pat. No. 7,325,486, issued Feb. 5, 2008.

BACKGROUND AND SUMMARY

The invention relates to food processing systems, including cooking and/or chilling, for example in processing meat products such as hot dogs, sausages, poultry, fish, and other food products.

In one aspect, a loading system is provided for fast, efficient loading from a serial supply line into a food processing chamber.

In another aspect, an improved conveyance system is provided through the food processing chamber, including improved food product cradles and carriers.

In another aspect, a simple, effective discharge system is provided at the unloading station.

In another aspect, an effective cleaning system is provided.

DETAILED DESCRIPTION OF THE INVENTION

Figure 1:
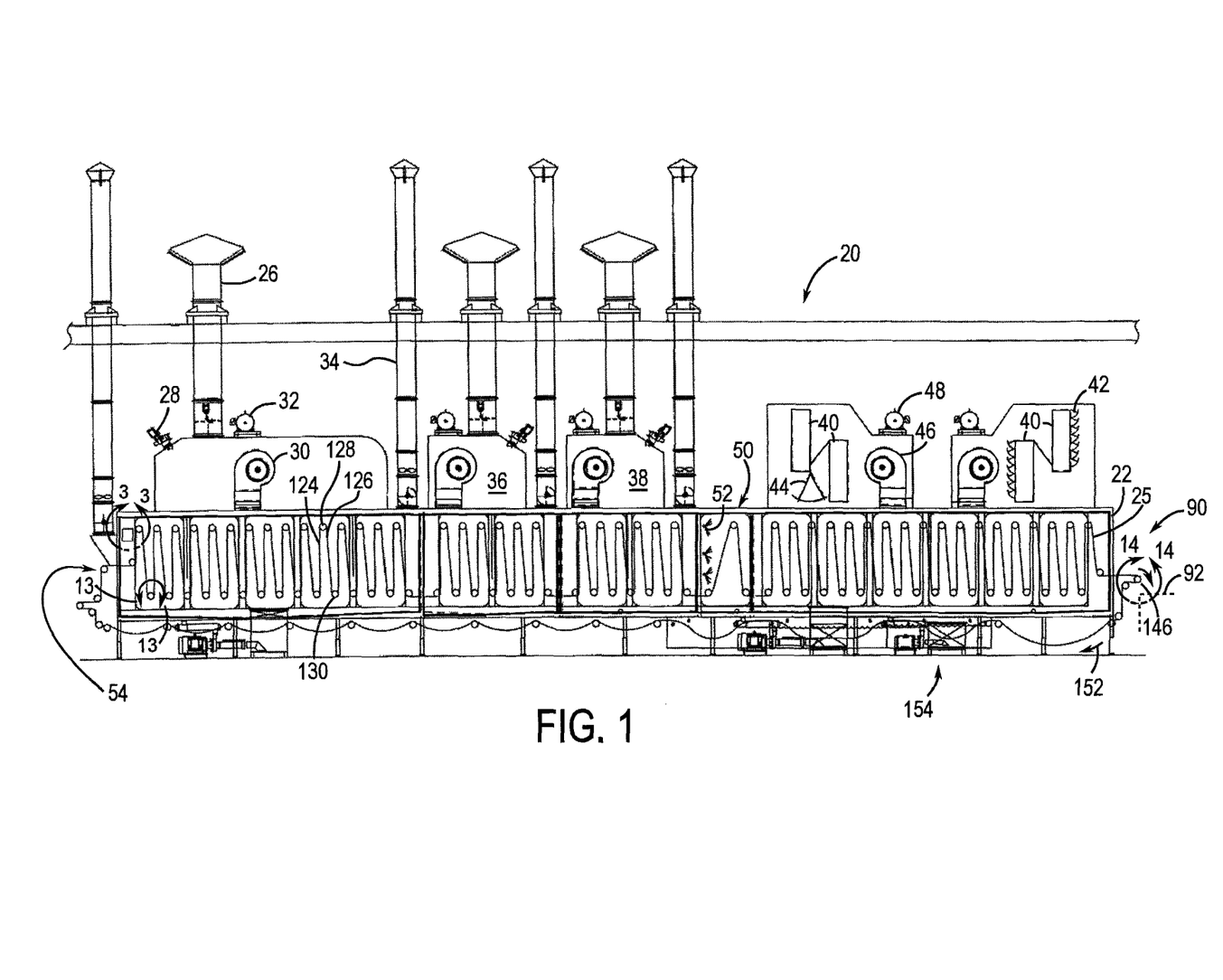
FIG. 1 is a side elevation view partially cut away of a food processing system in accordance with the invention.
Figure 2:
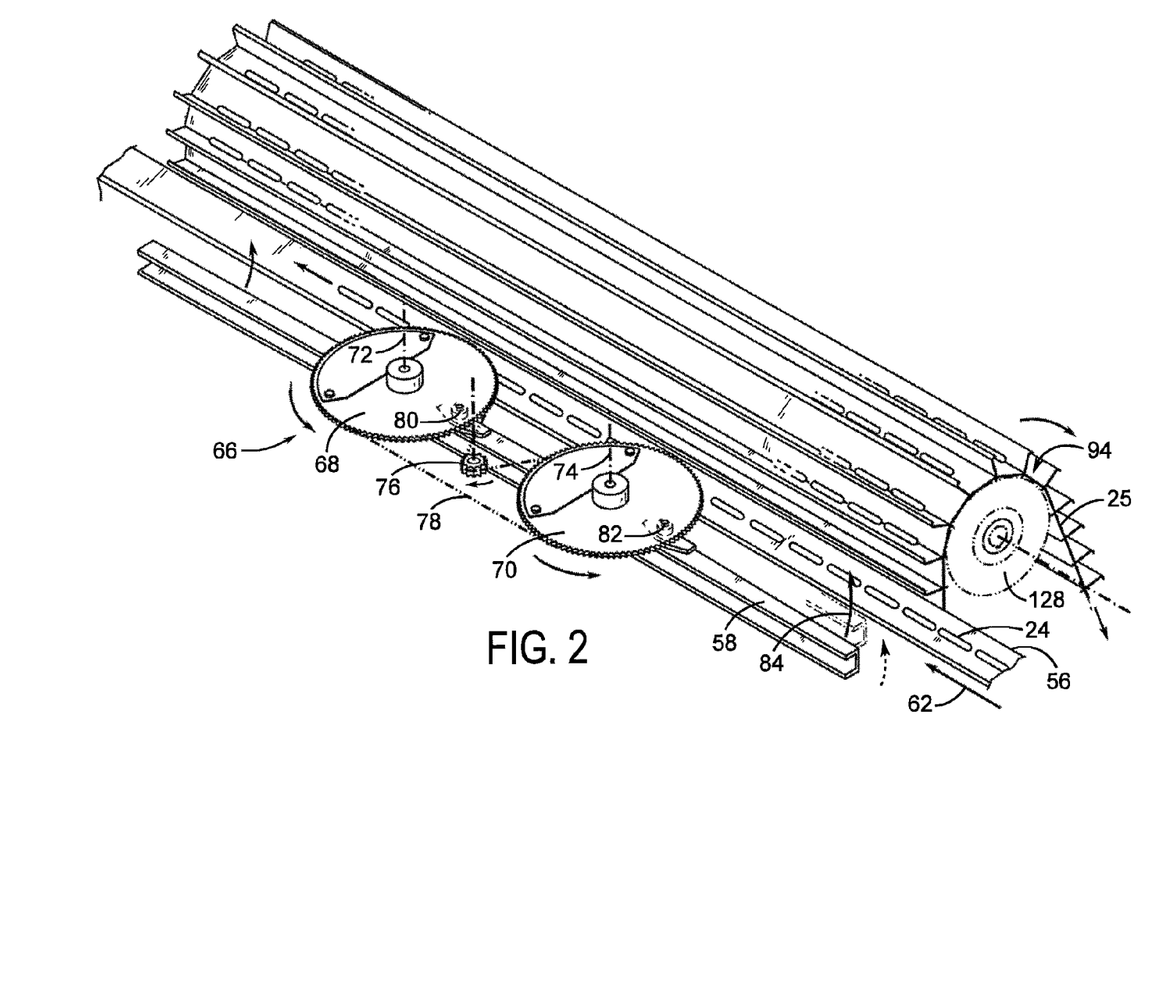
FIG. 2 is an enlarged perspective view of a portion of FIG. 1, at the loading station.
Figures 9, 10, 11:
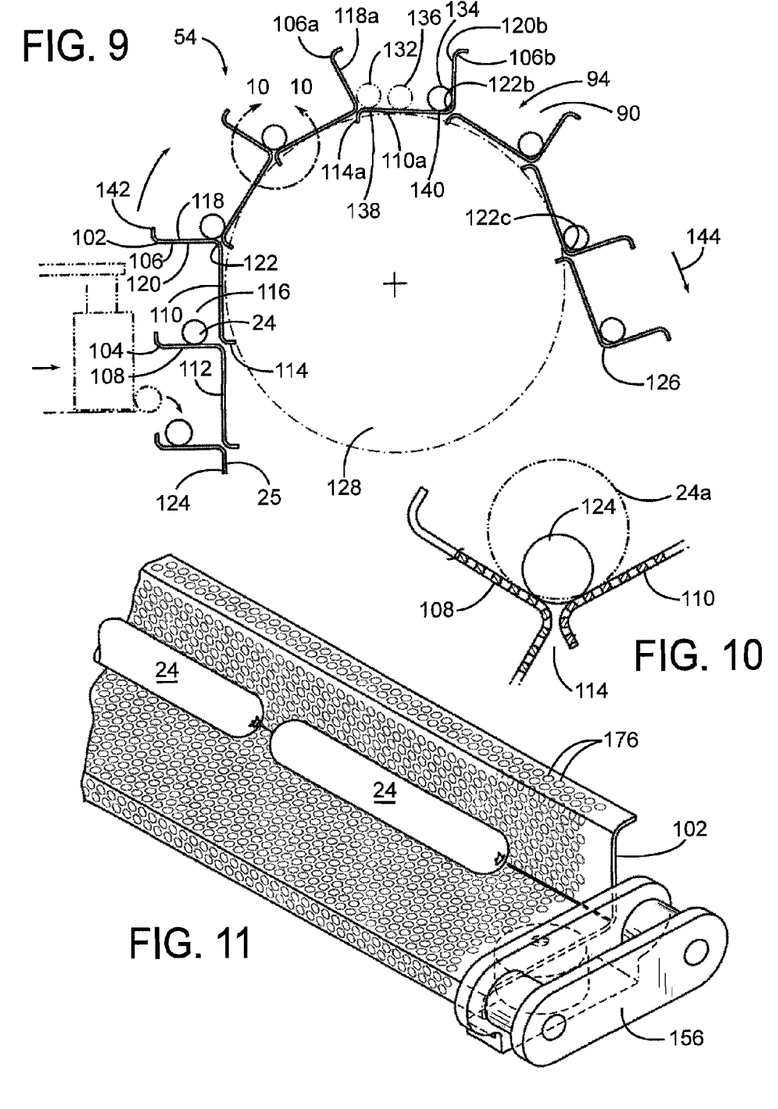
FIG. 9 schematically illustrates operation of the structure of FIG. 7.
FIG. 10 is a view taken along line 10-10 of FIG. 9.
FIG. 11 is an enlarged perspective view of a portion of FIG. 1.

FIG. 1 shows food processing apparatus 20 including a food processing chamber 22 for processing a food product 24, FIGS. 2, 11, such as meat products, e.g. hot dogs, sausage, poultry, fish, or other food products. The food product is transported through chamber 22 by a conveyor 25, preferably a serpentine conveyor. Food processors with continuous serpentine chain conveyors are known in the prior art, for example U.S. Pat. Nos. 4,138,860, 4,277,954, 4,329,850, 4,784,053, 5,253,569, all incorporated herein by reference. Also known in the prior art are various processing and circulating systems and compartments for providing cooking heat by steam, hot water, hot air or the like, and chilling by a tap water shower, recirculated brine or glycol, cooled air or the like, for example the noted incorporated U.S. Pat. No. 5,253,569. Such heating, cooling and circulation systems may include, for example, a fresh air inlet such as 26, a source of heat such as a gas burner 28, a blower such as 30 driven by a motor such as 32 for circulating heated air through one or more compartments through which the serpentine conveyor travels, and an exhaust such as 34. The heating and circulation system may be repeated in further compartments such as shown at 36, 38. The systems may further include refrigeration coils such as 40 having defrost dampers such as 42 and balancing dampers such as 44 for providing and directing cooling chilling air as circulated by blowers such as 46 driven by motors such as 48, all as is known in the prior art. The heating and chilling zones may be separated by a shower zone such as 50 having shower nozzles such as 52 for pre-cooling the food product after the heating zone and prior to the chilling zone, as is known in the prior art.

The food product is loaded onto conveyor 25 at loading station 54, FIGS. 1-9. Another conveyor 56 delivers the food product serially to loading station 54. In one embodiment, conveyor 56 delivers food product from a system, such as a sausage making machine sold by Townsend Engineering Co. under their trademark KONTURA. At the loading station, a serial-to-parallel transfer loading delivery system, to be described, transfers food product 24 in parallel from conveyor 56 to conveyor 25. The food product is a plurality of food items 24 delivered end-to-end on conveyor 56 to loading station 54. The serial-to-parallel transfer loading delivery system includes a transfer bar 58 transferring a plurality of food items 24 simultaneously to conveyor 25 from conveyor 56. Conveyor 56 continuously delivers food items 24 to loading station 54 and continuously travels through the loading station. Transfer bar 58 transfers food items in batches to conveyor 25 without halting conveyor 56. This provides fast, efficient operation and overcomes prior disadvantages when it is necessary to stop conveyor 56 to enable loading of the food product into processing chamber 22. Transfer bar 58 moves into and out of the path of movement of food items 24 carried on conveyor 56. Transfer bar 58 moves at a speed equal to or greater than conveyor 56 such that transfer bar 58 engages and transfers a batch of food items to conveyor 25, including the last food item in series in the batch, and then retracts out of the path of movement of the food items before the serially successive next food item.

Figure 3:
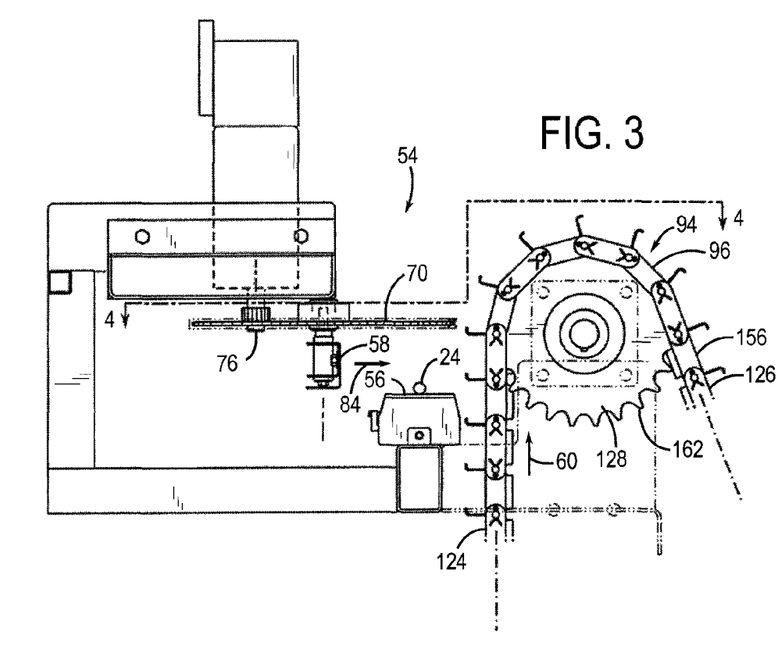
FIG. 3 is an enlarged view taken along line 3-3 of FIG. 2.
Figure 4:
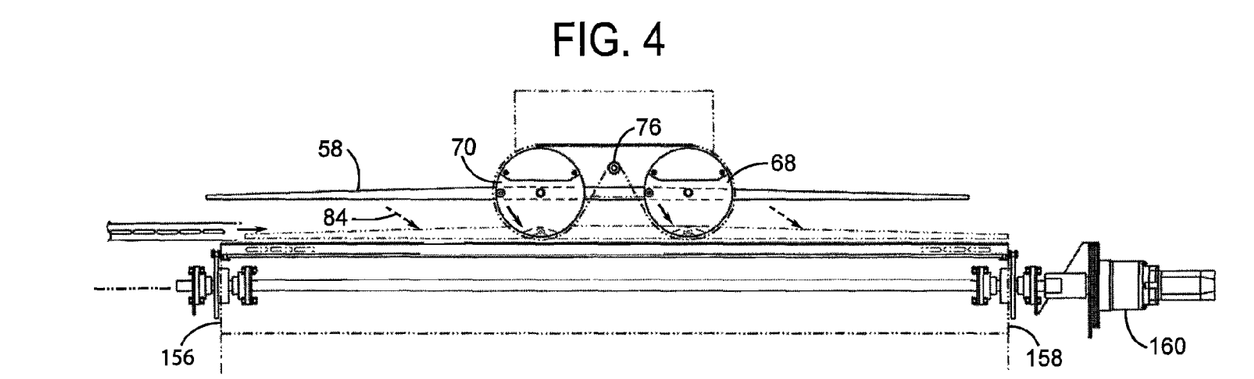
FIG. 4 is a view taken along line 4-4 of FIG. 3.
Figure 5:
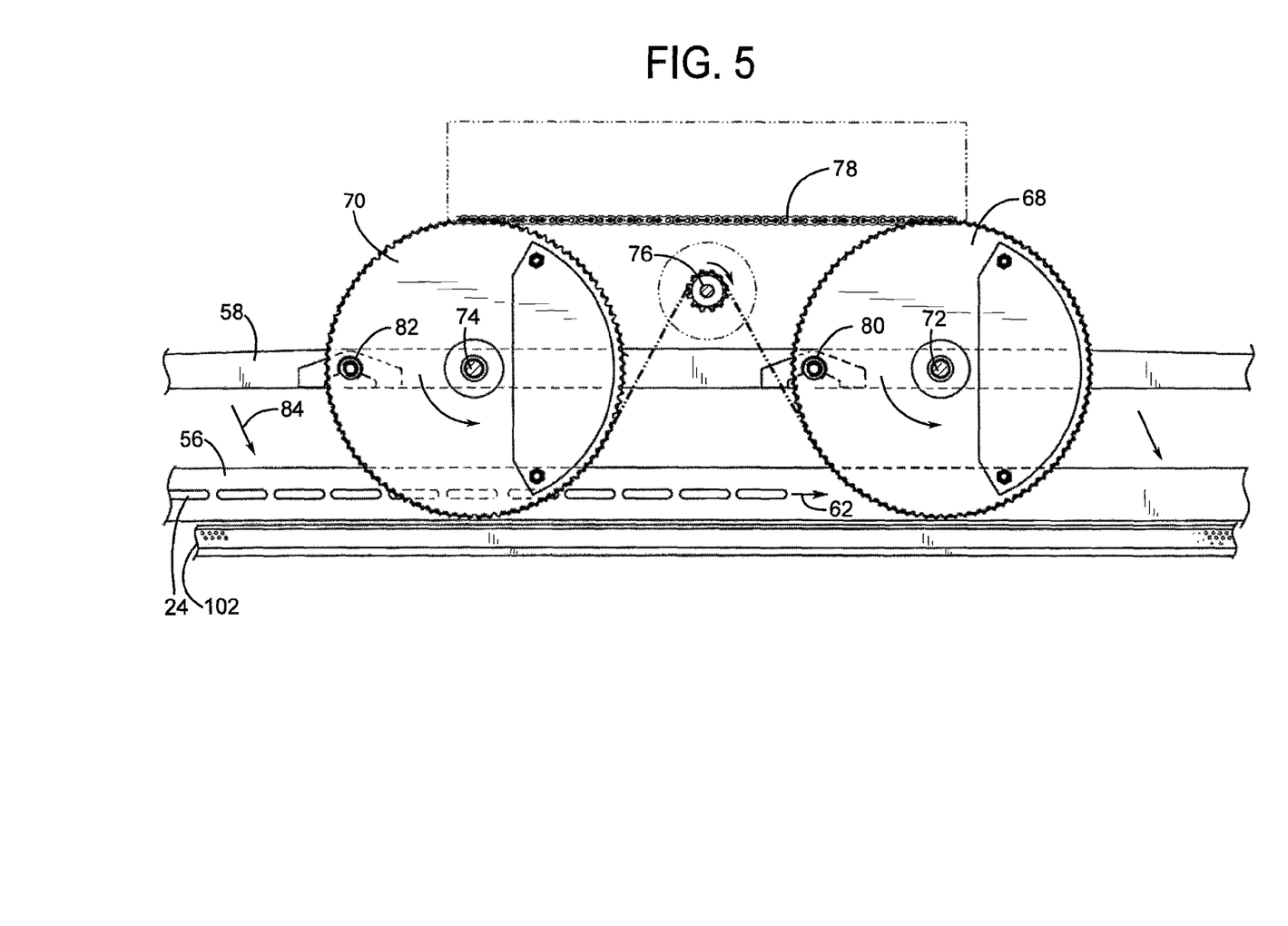
FIG. 5 is an enlarged view of a portion of FIG. 4.
Figure 6:
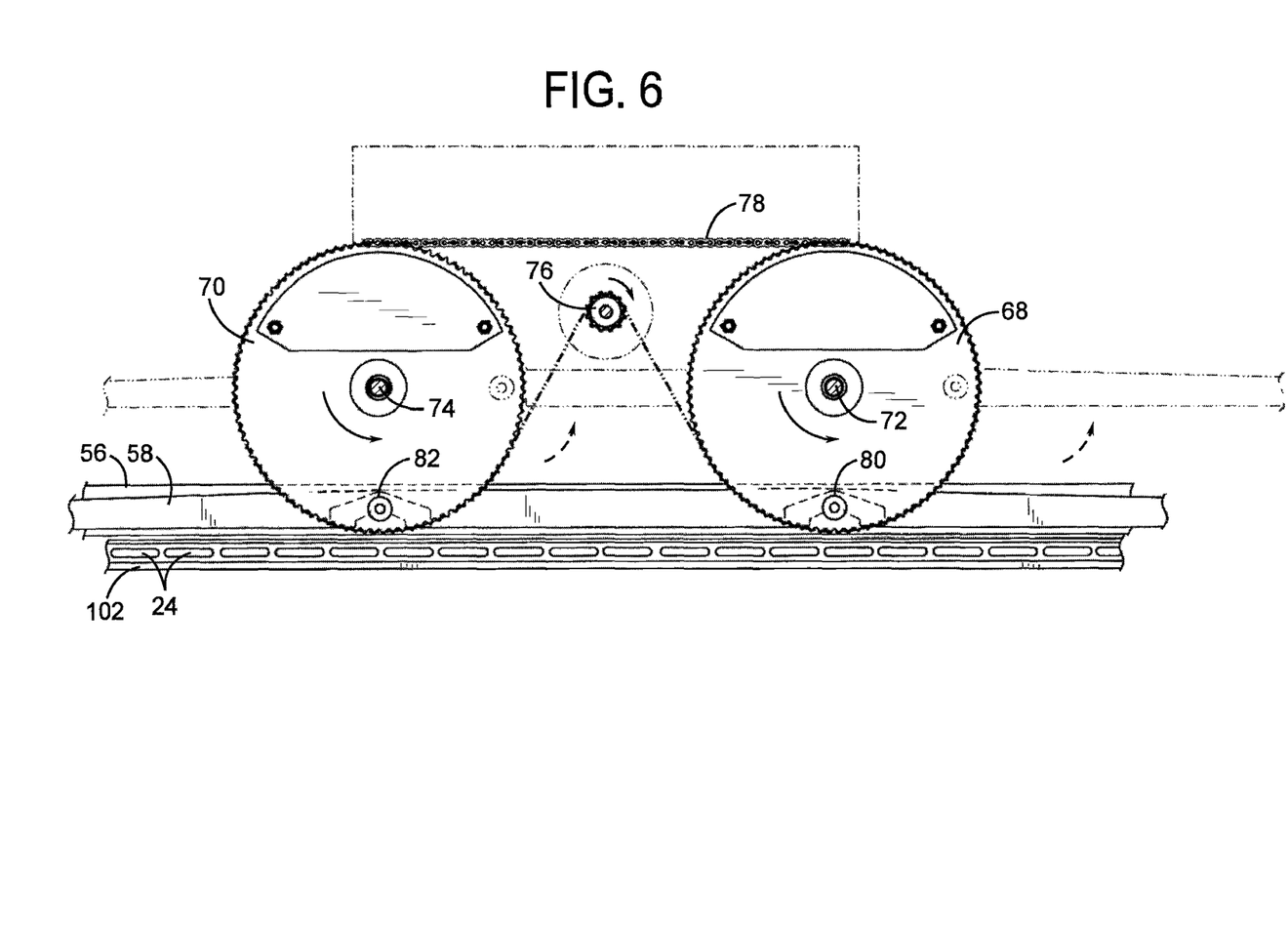
FIG. 6 is like FIG. 5 and illustrates another operational position.
Figure 7:
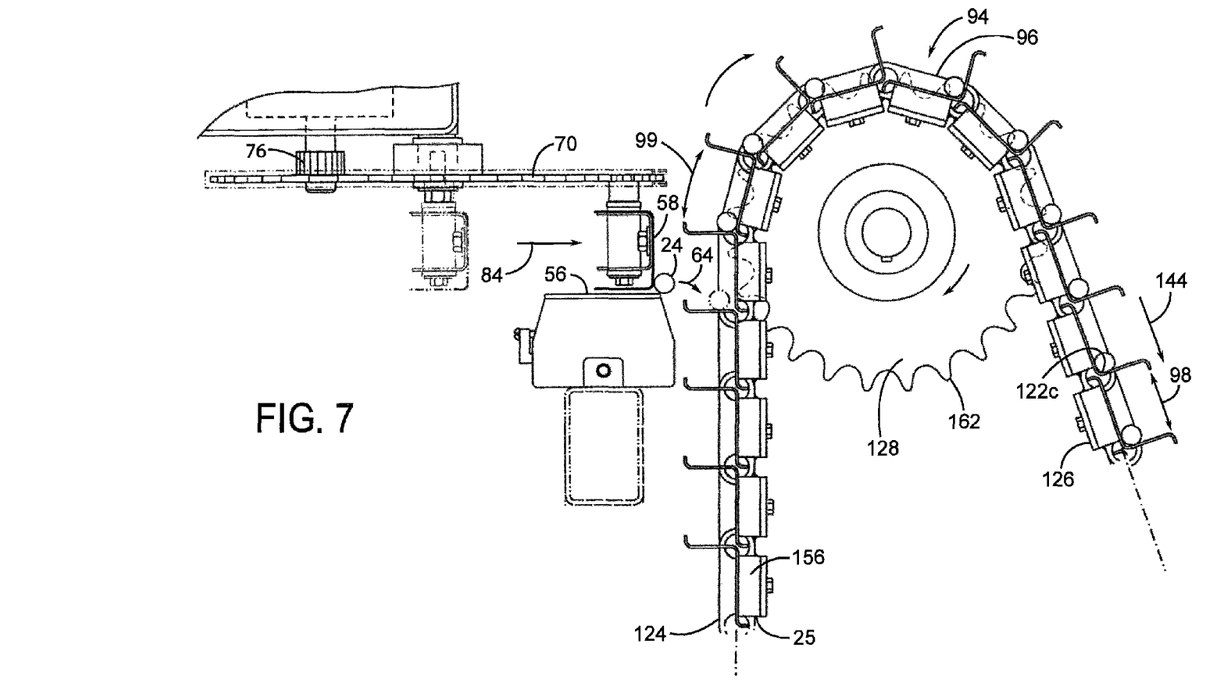
FIG. 7 is an enlarged view of a portion of FIG. 3 and illustrates operation.
Figure 8:
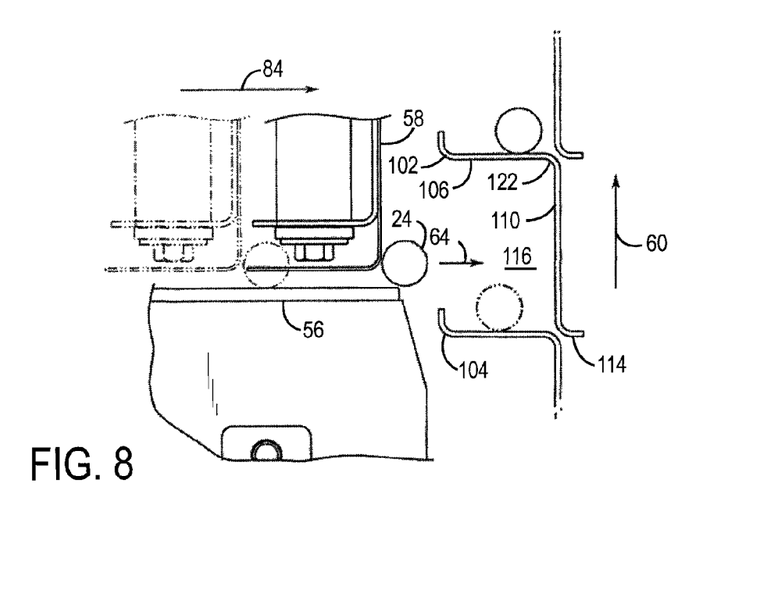
FIG. 8 is an enlarged view of a portion of FIG. 7.

Conveyor 25 travels through loading station 54 in a first direction 60, FIGS. 3, 8. Conveyor 56 travels through the loading station in a second direction 62, FIGS. 2, 5. Transfer bar 58 transfers the food product from conveyor 56 to conveyor 25 in a third direction 64, FIG. 8. Each of the noted first, second and third directions is transverse to each other. A transfer mechanism 66, FIG. 2, is provided by a pair of rotary disks 68, 70, each rotation about a respective rotational axis 72, 74. Transfer bar 58 is journaled to each of the disks and translated thereby for reciprocal movement into and out of the path of movement of food product 24 on conveyor 56. The transfer mechanism includes a drive train, such as a drive spindle 76, and a belt 78, preferably a chain belt, trained around rotary disks 68, 70 and drive spindle 76 for rotating the disks in response to rotation of the drive spindle. Transfer bar 58 is journaled to each of disks 68, 70 at a respective journal point 80, 82, FIG. 5, spaced radially outwardly of the respective rotational axis 72, 74, such that rotation of disks 68, 70 drives transfer bar 58 from a retracted position, FIG. 5, to an extended position, FIG. 6. In FIG. 4, the retracted position of transfer bar 58 is shown in solid line, and the extended position is shown in phantom. In FIG. 6, the retracted position is shown in phantom, and the extended position is shown in solid line. In FIG. 7, the retracted position is shown in phantom, and the extended position is shown in solid line. Each journal point 80, 82 moves in a circle. Transfer bar 58 moves in an arc having a vector component into and out of the path of movement of food product 24 on conveyor 56 transverse to the noted first direction 60 and to the noted second direction 62, and having a vector component also pushing food product 24 from conveyor 56 forwardly, arrow 84, FIGS. 2, 5, in the same direction thereof onto conveyor 25, such that rotation of disks 68, 70 translate transfer bar 58 to transfer food product 24 transversely from conveyor 56, as shown at arrow 64, FIGS. 7, 8, and also forwardly therefrom and in the same direction thereof from conveyor 56 to conveyor 25, as shown at arrow 84 in FIGS. 2 and 5.

Figure 14:
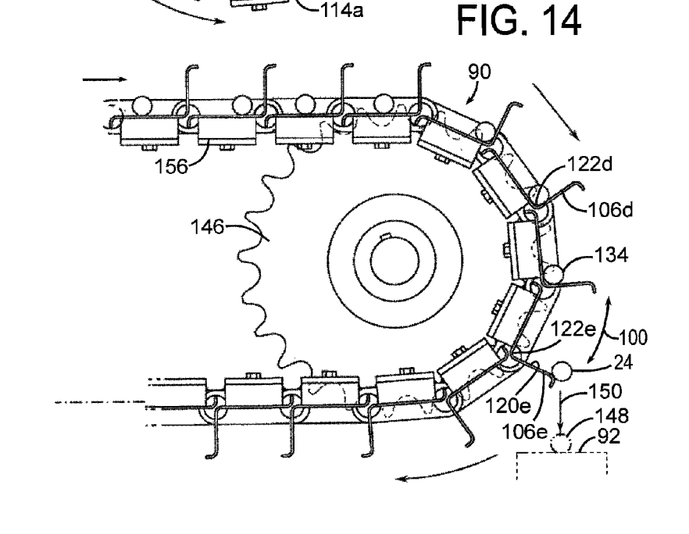
FIG. 14 is an enlarged view taken along line 14-14 of FIG. 1.

Serpentine conveyor 25 transports food product 24 through chamber 22 from loading station 54 to unloading station 90 where the food product is discharged to another conveyor such as shown in phantom at 92 in FIG. 1. A plurality of food product cradles 94, FIGS. 2, 7, 9, carry food product 24 through chamber 22 from loading station 54 to unloading station 90. Each cradle has an opening 96 receiving food product 24 at loading station 54 and discharging the food product at unloading station 90. The opening has a width 98, FIG. 7 which varies during traversal of conveyor 25 from a loading station 54 to unloading station 90. The width 98 of opening 96 becomes wider at unloading station 90 as shown at increased width 100, FIG. 14. Cradle 94 is provided by two pieces, namely a leading food product carrier 102, FIG. 9, and a trailing food product carrier 104. Each carrier has a first segment 106, 108, respectively, and a second segment 110, 112, respectively. Cradle 94 is formed by the second segment 110 of the leading food product carrier and the first segment 108 of the trailing food product carrier immediately therebehind. Second segment 110 of the leading food product carrier is separated from the first segment 108 of the trailing food product carrier by a gap 114. Gap 114 is distally oppositely spaced from opening 96 by a food product cavity 116 containing food product 24 therein. The width of opening 96 and the orientation of gap 114 vary during traversal of conveyor 25 from loading station 54 to unloading station 90.

The noted plurality of two-piece food product cradles 94 are each formed by the noted second segment 110 of a leading food product carrier 102 and the first segment 108 of a trailing food product carrier 104 immediately therebehind. The second segment 110 of the leading food product carrier is separated from the first segment 108 of the trailing food product carrier by the noted gap 114. Food product 24 is carried, FIG. 10, by both the second segment 110 of the leading food product carrier and the first segment 108 of the trailing food product carrier and spans gap 114 during designated portions of the travel path of conveyor 25. Gap 114 has a width less than the width of food product 24 such that the food product cannot fall through gap 114 in cradle 94, including for large food items as shown in phantom at 24a in FIG. 10, and smaller food items as shown in solid line at 24 in FIG. 10. The noted first segment of each food product carrier has first and second opposite faces 118 and 120. First face 118 faces forwardly toward the next food product carrier thereahead. Second face 120 faces aft toward the next food product carrier therebehind. Second face 120 meets the noted second segment 110 at a junction 122.

Conveyor 25 has a plurality of upwardly traveling flights such as 124, FIGS. 1, 3, 7, 9, 13, and a plurality of downwardly traveling flights 126 joined by upper and lower loops 128, 130, respectively. Food product 24 changes from a first position 132, FIG. 9, to a second position 134 as the conveyor travels around a respective loop such as 128. The food product in position 132 is carried by the second segment 110a of a leading food product carrier and the first face 118a of the first segment 106a of a trailing food product carrier and spans gap 114a therebetween. The food product in the second position 134 is carried by the second segment 110a and the second face 120b of the first segment 106b of the same carrier at junction 122b. In the case of a cylindrical food product, such as a hot dog or sausage, the food product rolls as shown at 136 from first position 132 to second position 134. Second segment 110 of the carrier is flat to facilitate the noted rolling and to minimize surface area contact with food product 24, touch-marks on the food product, and tendency of the food product to stick to the carrier, for example as otherwise caused by curved or concave food product carriers which have larger surface area contact and hence larger touch-marks, and also greater tendency to stick to the food product.

Food product 24 changes from the noted first position 132 to the noted second position 134 as conveyor 25 travels around an upper loop 128. Food product 24 changes from the noted second position 134 to the noted first position 132 as conveyor 25 travels around a lower loop 130, FIG. 13. Food product 24 in the noted first position 132 is carried by two food product carriers, namely the second segment 110a of a leading food product carrier and the first face 118a of the first segment 106a of the immediately trailing food product carrier. Food product 24 in the second position 134 is carried by one food product carrier, namely the second segment 110a of the one food product carrier and the second face 120b of the first segment 106b of the same such one food product carrier. Food product 24 changes location along the noted second segment 110a between the noted first and second positions 132 and 134. Food product 24 in the first position 132 engages second segment 110a at a first location 138 therealong. Food product 24 in the noted second position 134 engages second segment 110a at a second location 140 therealong.

In the preferred embodiment, each food product carrier is L-shaped and has a first leg providing first segment 106, and a second leg providing second segment 110. The first leg at 106 extends substantially horizontally during travel of conveyor 25 in upward flight 124. The second leg at 110 extends substantially vertically during travel of conveyor 25 in upward flight 124. The first and second legs meet at the noted junction 122. The first leg has an upwardly turned lip 142 at the end thereof opposite junction 122. Lip 142 is turned to extend from first leg 106 in a direction opposite to second leg 110, such that lip 142 extends upwardly during travel of conveyor 25 in upwardly traveling flight 124. Travel of conveyor 25 along downward flight 126 is along a given downward angle as shown at arrow 144, FIG. 7, 9, 13, such that food product 24 is carried at the junction of the noted legs, for example as shown at junction 122c. Food product 24 changes positions between loading station 54 and unloading station 90. Food product 24 is in the noted first position 132 at the loading station, and is in the noted second position 134 at the unloading station. The conveyor traverses around a discharge loop 146, FIGS. 1, 14, at the unloading station. The noted junction 122 changes from an upwardly facing orientation as shown at 122d to a downwardly facing orientation as shown at 122e, including a change in orientation of first segment 106 from upwardly angled as shown at 106d to downwardly angled as shown at 106e. Food product 24 falls by gravity along and exits from downwardly angled first segment 106e, and then falls on conveyor 92 as shown in phantom at 148 and at arrow 150. Food product 24 engages the second face as shown at 120e of the first segment as shown at 106e at unloading station 90 and discharges therealong at discharge loop 146. Food product 24 engages the first face as shown at 118 in FIG. 9 of the first segment 106 at loading station 54.

Conveyor 25 has a return path as shown at arrow 152, FIG. 1, from unloading station 90 to loading station 54 external of chamber 22. In preferred form, each of the noted first and second segments 106 and 110 of the food product carriers are flat. A washing station 154 is provided external to chamber 22 and along return path 152 for washing the food product carriers. The noted flat conveyor segments 106, 110, etc. facilitate access of the washing station and the washing spray therefrom to the food product carriers and rinsing thereof to facilitate removal of food product remnants.

Figure 12:
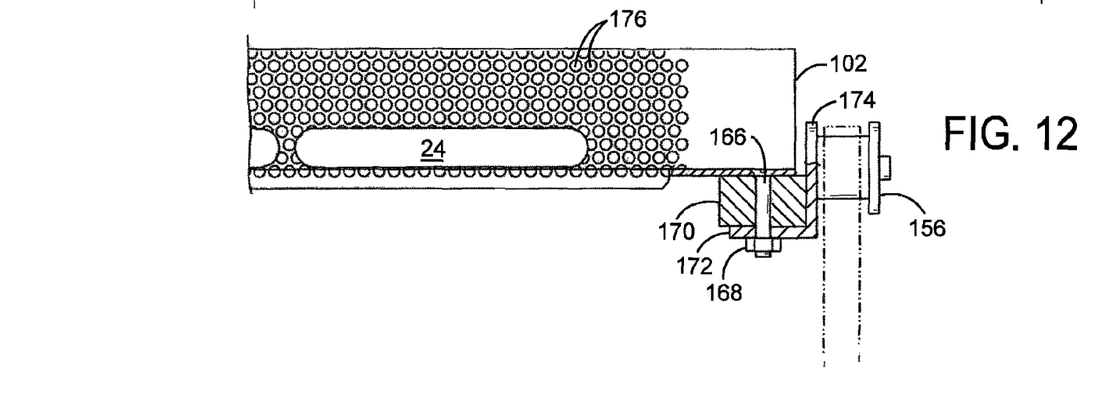
FIG. 12 is an end view partially cut away of the structure of FIG. 11.
Figure 13:
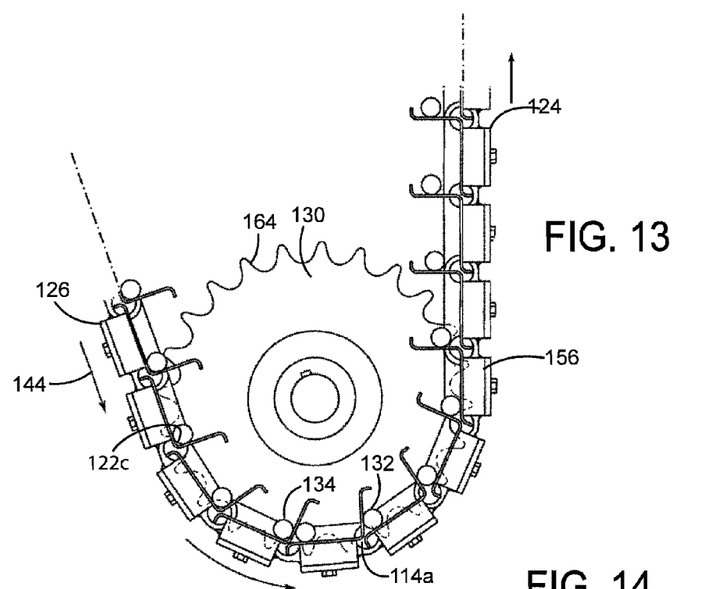
FIG. 13 is an enlarged view taken along line 13-13 of FIG. 1.
Figure 15:
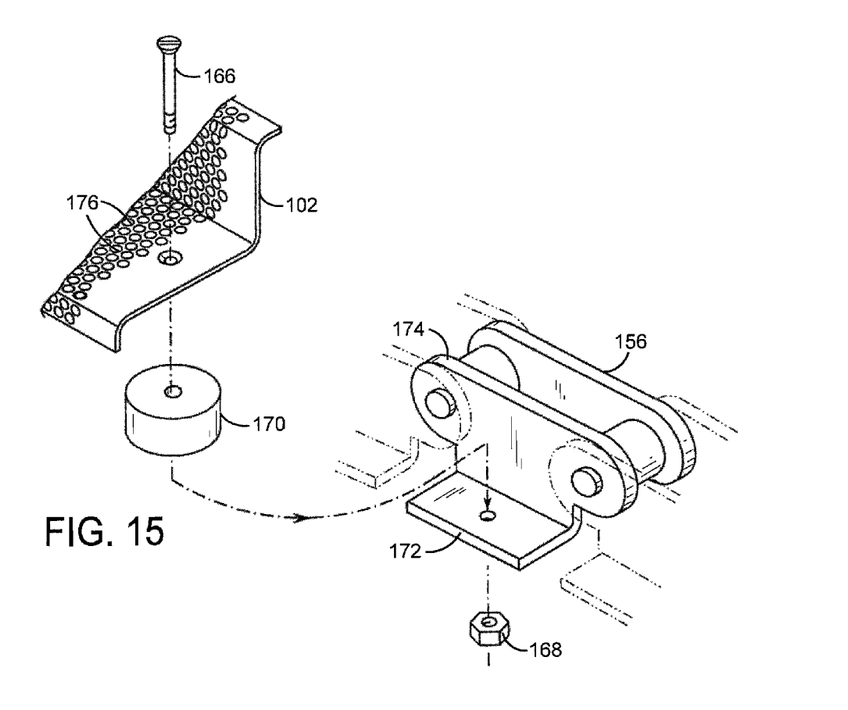
FIG. 15 is an exploded perspective view of the structure of FIG. 11.

The conveyor is preferably provided by a pair of transversely spaced chains 156, 158, FIGS. 3, 4, 7, 11-15, driven by a motor drive 160 and traversing around upper and lower sprockets 162 and 164 providing the noted upper and lower loops 128 and 130, respectively. The food product carriers 102, etc., FIGS. 15, 11, 12, are mounted by respective bolts 166 and nuts 168 and grommets 170 to a respective flange 172 on a respective chain link 174. Each food product carrier 102 is the noted L-shaped member and preferably perforated with a plurality of perforations 176 to facilitate circulation of the processing medium therethrough, such as steam, hot air, cold air, cold rinse, etc., to maximize contact of such processing medium with the food product, and also to minimize surface contact area of the carrier with the food product to in turn minimize touch-marks which are objectionable for final product appearance, and to minimize the noted sticking.

The present system provides a method for processing a food product 24 including providing a food processing chamber 22, providing a first conveyor 25 for transporting the food product through the chamber, providing a loading station 54 for loading the food product onto the first conveyor, providing a second conveyor 56 for conveying the food product to the loading station, conveying the food product serially, e.g. end-to-end, on the second conveyor to the loading station, transferring the food product in parallel from the second conveyor to the first conveyor, and transporting the food product on the first conveyor through the chamber. The method further includes conveying a plurality of food items end-to-end from the second conveyor to the loading station, and transferring a plurality of food items simultaneously to the first conveyor from the second conveyor. The method includes continuously conveying the food items on the second conveyor to the loading station and transferring the food items in batches to the first conveyor without halting the second conveyor. The method includes providing a transfer bar transferring the food items from the second conveyor to the first conveyor, moving the transfer bar into and out of the path of movement of the food items on the second conveyor at a speed equal to or greater than the conveyance speed of the second conveyor such that the transfer bar engages and transfers a batch of food items to the first conveyor, including the last food item in series in the batch, and then retracts out of the path of movement of the food items before the serially successive next food item on the second conveyor. The method includes conveying the food product on the first conveyor through the loading station in a first direction, conveying the food product on the second conveyor through the loading station in a second direction, and transferring the food product from the second conveyor to the first conveyor in a third direction, wherein each of the noted first, second and third directions is transverse to each other.

The present method further includes providing a plurality of food product cradles 94 on conveyor 25 for carrying food product 24 through chamber 22 from the loading station to the unloading station, providing each cradle with an opening 96 for receiving the food product at the loading station and discharging the food product at the unloading station, and including loading the food product on the conveyor at the loading station through the opening in the food product cradle, conveying the food product through the chamber on the conveyor, and discharging the food product from the conveyor at the unloading station through the opening in the cradle, and including varying the width 98 of the opening during traversal of the conveyor from the loading station to the unloading station. The method includes widening the opening to a wider width 100 at the unloading station. In a further embodiment, the food product is loaded onto conveyor 25 at a wider width opening such as 99, FIG. 7. The method further includes providing a plurality of food product carriers 102, 104, etc. on the conveyor, each carrier having a first segment 106, 108, etc., and a second segment 110, 112, etc., providing a plurality of two-piece cradles 94 each formed by the second segment of a leading food product carrier and the first segment of a trailing food product carrier immediately therebehind, separating the second segment of a leading food product carrier from the first segment of a trailing food product carrier by a gap 114, carrying the food product on both the second segment of a leading food product carrier and the first segment of a trailing food product carrier during designated portions of the travel path of the conveyor such that the food product spans the gap 114*a*. The method includes varying the orientation of the gap during traversal of the conveyor through the chamber. The method includes providing the first segment with first and second opposite faces 118, 120, the first face facing forwardly toward the next food product carrier thereahead, the second face facing aft toward the next food product carrier therebehind, the second face meeting the second segment at a junction 122. The method includes providing the conveyor with a plurality of upwardly traveling flights 124 and a plurality of downwardly traveling flights 126 joined by upper and lower loops 128 and 130, and further including changing the position of the food product from a first position 132 to a second position 134 as the conveyor travels around a respective loop, carrying the food product in the first position on the second segment and the first face of the first segment and spanning the gap, and carrying the food product in the second position on the second segment and the second face of the first segment at the junction. When the food product is cylindrical, the method further includes rolling (136) the food product between the first and second positions by gravity, and providing a flat second segment 110*a* to facilitate the rolling and minimize surface area contact with the food product and touch-marks on the food product and the noted sticking. The method further includes changing the food product from the first position to the second position as the conveyor travels around an upper loop, and changing the food product from the second position to the first position as the conveyor travels around a lower loop. The method further includes carrying the food product in the first position on two food product carriers, namely the second segment of a leading food product carrier and the first face of the first segment of the immediately trailing food product carrier, and carrying the food product in the second position on one food product carrier, namely the second segment of the one food product carrier and the second face of the first segment of the same such one food product carrier. The method further includes changing the location of the food product along the second segment between the first and second positions, the food product in the first position engaging the second segment at a first location 138 therealong, the food product in the second position engaging the second segment at a second location 140 therealong. In the preferred embodiment, the first and second segments meet at a junction 122, and the method further includes changing the position of the food product between the first and second positions as the conveyor traverses through the chamber, carrying the food product in the first position by the second segment of a leading food product carrier and the first segment of a trailing food product carrier and spanning the gap 114a therebetween, and carrying the food product in the second position by a single carrier, namely at the junction 122b of the first and second segments of the same such single carrier. The method includes transferring the food product to the conveyor 25 at the loading station, and transferring the food product from the conveyor 25 at the unloading station, and changing positions of the food product between the loading and unloading stations, the food product being in one of the first and second positions at the loading station, the food product being in the other of the first and second positions at the unloading station. The method includes changing the position of the food products multiple times between the loading station and the unloading station, e.g. during each traversal around a respective upper and lower loop 128 and 130. In the preferred embodiment, the food product is carried in the first position at the loading station, and is carried in the second position at the unloading station. The method further includes traversing the conveyor 25 around a discharge loop 146 at the unloading station, changing the noted junction from an upwardly facing orientation 122d to a downwardly facing orientation 122e at the unloading station including a change in orientation of the first segment from upwardly angled at 106d to downwardly angled at 106e, and discharging the food product by gravity along the downwardly angled first segment. The method further includes providing the first segment with first and second opposite faces 118 and 120, the first face facing forwardly toward the next food product carrier thereahead, the second face facing aft toward the next food product carrier therebehind. The second face meeting the second segment at the junction 122, and carrying the food product on the second face 120e of the first segment 106e at the unloading station and discharging the food products therealong at the discharge loop.

It is recognized that various equivalents, alternatives and modifications are possible within the scope of the appended claims.

What is claimed is:

1. A food product transporter for a food processing apparatus having a food processing chamber for processing a food product, a serpentine conveyor for transporting said food product in a forward transport direction through said chamber from a loading station to an unloading station, said conveyer comprising first and second chains laterally spaced alone a lateral direction transverse to said forward transport direction, and a plurality of food product cradles on said conveyor for carrying said food product through said chamber from said loading station to said unloading station, each of said cradles comprising an opening receiving said food product at said loading station and discharging said food product at said unloading station, said opening having a width which varies during transversal of said conveyor from said loading station to said unloading station, wherein each of said cradles comprises two pieces comprising a leading food product carrier and a trailing food product carrier, each carrier of said carriers having a first segment and a second segment wherein said first and second segments meet at a junction, each of said cradles being formed by said second segment of said leading food product carrier and said first segment of said trailing food product carrier immediately therebehind, each of said cradles spanning laterally between and suspended between first and second sides replaceably mounted respectively to said first and second chains, wherein said conveyor has a plurality of upwardly traveling flights and a plurality of downwardly traveling flights, wherein each of said food product carriers is L-shaped and has a first leg providing said first segment, and a second leg providing said second segment, said first leg extending substantially horizontally during travel of said conveyor in one of said upwardly traveling flights, said second leg extending substantially vertically during travel of said conveyor in one of said upwardly traveling flights, said first and second legs meeting at said junction, wherein said first leg has a turned first lip at the end of said first leg opposite said junction, said first lip being turned to extend from said first leg in a direction opposite to said second leg such that said first lip extends upwardly during travel of said conveyor in one of said upwardly traveling flights, wherein said second leg has a turned second lip at the end of said second leg opposite said junction, said second lip being turned to extend from said second leg opposite to said first leg such that said second lip extends transversely during travel of said conveyor in one of said upwardly traveling flights.

2. The food product transporter according to claim 1 wherein said width of said opening becomes wider at said unloading station.

3. The food product transporter according to claim 1 wherein said first segment extends transversely from said conveyor, and said second segment extends parallel to said conveyor.

4. The food product transporter according to claim 1 wherein said second segment of said leading food product carrier is separated from said first segment of said trailing food product carrier by a gap, said gap being separated from said opening by a food product cavity therebetween containing said food product, and wherein both the orientation of said gap and the width of said opening vary during traversal of said conveyor from said loading station to said unloading station.

5. A food product transporter for a food processing apparatus having a food processing chamber for processing a food product, a serpentine conveyor having a travel path for transporting said food product in a forward transport direction through said chamber, said conveyor comprising first and second chains laterally spaced along a lateral direction transverse to said forward transport direction, a plurality of food product carriers on said conveyor, each of said carriers having a first segment and a second segment wherein said first and second segments meet at a junction, a plurality of two-piece food product cradles each formed by the second segment of a leading food product carrier and the first segment of a trailing food product carrier immediately therebehind, each of said cradles spanning laterally between and suspended between first and second sides replaceably mounted respectively to said first and second chains wherein said conveyor has a plurality of upwardly traveling flights and a plurality of downwardly traveling flights joined by upper and lower loops, said second segment of said leading food product carrier being separated from said first segment of said trailing food product carrier by a gap, and wherein said food product is carried by both said second segment of said leading food product carrier and said first segment of said trailing food product carrier and spans said gap during designated portions of the travel path of said conveyor wherein each of said food product carriers is L-shaped and has a first leg providing said first segment, and a second leg providing said second segment, said first leg extending substantially horizontally during travel of said conveyor in one of said upwardly traveling flights, said second leg extending substantially vertically during travel of said conveyor in one of said upwardly traveling flights, said first and second legs meeting at said junction, wherein said first leg has a turned first lip at the end of said first leg opposite said junction, said first lip being turned to extend from said first leg in a direction opposite to said second leg such that said first lip extends upwardly during travel of said conveyor in one of said upwardly traveling flights, wherein said second leg has a turned second lip at the end of said second leg opposite said junction, said second lip being turned to extend from said second leg opposite to said first leg such that said second lip extends transversely during travel of said conveyor in one of said upwardly traveling flights.

6. The food product transporter according to claim 5 wherein said gap has a width less than the width of said food product such that said food product cannot fall through said gap in said cradle.

7. The food product transporter according to claim 5 wherein said gap has an orientation that varies during traversal of said conveyor through said chamber.

8. The food product transporter according to claim 5 wherein said first segment has first and second opposite faces, said first face facing forwardly toward the next food product carrier thereahead, said second face facing aft toward the next food product carrier therebehind, said second face meeting said second segment at said junction, and wherein said food product changes position from a first position to a second position as said conveyor travels around a respective loop, said food product in said first position being carried by said second segment and said first face of said first segment and spanning said gap, said food product in said second position being carried by said second segment and said second face of said first segment at said junction.

9. The food product transporter according to claim 8 wherein said food product is cylindrical and rolls from said first position to said second position.

10. The food product transporter according to claim 9 said second segment is flat to facilitate said rolling and to minimize surface area contact with said food product and touchmarks on said food product and sticking of said food product to one of said food product carriers.

11. The food product transporter according to claim 8 wherein said food product changes position from said first position to said second position as said conveyor travels around one of the upper loops, and wherein said food product changes position from said second position to said first position as said conveyor travels around one of the lower loops.

12. The food product transporter according to claim 8 wherein said food product in said first position is carried by two of the food product carriers, namely said second segment of a leading food product carrier and said first face of said first segment of the immediately trailing food product carrier, and wherein said food product in said second position is carried by a single one of the food product carriers, namely said second segment of said leading food product carrier and said second face of said first segment of said leading food product carrier.

13. The food product transporter according to claim 12 wherein said food product changes location along said second segment between said first and second positions, said food product in said first position engaging said second segment at a first location therealong, said food product in said second position engaging said second segment at a second location therealong.

14. The food product transporter according to claim 5 wherein travel of said conveyor in one of said downwardly traveling flights is along a given downward angle such that said food product is carried at said junction of said first and second legs.

15. The food product transporter according to claim 5 wherein said food product changes between first and second positions as said conveyor traverses through said chamber, said food product in said first position being carried by said second segment of said leading food product carrier and said first segment of said trailing food product carrier and spanning the gap therebetween, said food product in said second position being carried by a single on of the carriers, namely at said junction of said first and said second segments of the same said single carrier.

16. The food product transporter according to claim 15 wherein said food processing apparatus includes a loading station transferring said food product to said conveyor, and an unloading station transferring said food product from said conveyor, and wherein said food product changes said positions between said loading station and said unloading station, said food product being in one of said first and second positions at said loading station, said food product being in the other of said first and second positions at said unloading station.

17. The food product transporter according to claim 16 wherein said food product changes position multiple times between said loading station and said unloading station.

18. The food product transporter according to claim 16 wherein said food product is in said first position at said loading station and is in said second position at said unloading station.

19. The food product transporter according to claim 18 wherein said conveyor traverses around a discharge loop at said unloading station, and wherein said junction changes from an upwardly facing orientation to a downwardly facing orientation including a change in orientation of said first segment from upwardly angled to downwardly angled, said food product falling by gravity along and exiting from said downwardly angled first segment.

20. The food product transporter according to claim 19 wherein said first segment has first and second opposite faces, said first face facing forwardly toward the next food product carrier thereahead, said second face facing aft toward the next food product carrier therebehind, said second face meeting said second segment at said junction, said food product engaging said second face of said first segment at said unloading station and discharging therealong at said discharge loop.

21. The food product transporter according to claim 20 wherein said food product engages said first face of said first segment at said loading station.

22. The food product transporter according to claim 5 wherein said food processing apparatus includes a loading station transferring said food product to said conveyor, and an unloading station transferring said food product from said conveyor, and wherein said conveyor has a return path from said unloading station to said loading station external of said food processing chamber, and wherein each of said first and second segments of said food product carriers are flat, and comprising a washing station external to said food processing chamber and along said return path of said conveyor for washing said food product carriers, said flat segments facilitating access of said washing station to said food product carriers and rinsing thereof to facilitate removal of food product remnants.

23. The food product transporter according to claim 5 wherein said food processing apparatus includes a loading station transferring said food product to said conveyor, and an unloading station transferring said food product from said conveyor, and wherein each said cradle has an opening distally opposite said gap and defining a food product cavity therebetween containing said food product, said opening receiving said food product therethrough at said loading station and discharging said food product therethrough at said unloading station, and wherein the width of said opening varies during traversal of said conveyor from said loading station to said unloading station.

24. A food product transporter for a food processing apparatus having a food processing chamber for processing a food product, a serpentine conveyor having a travel path for transporting said food product in a forward transport direction through said chamber, said conveyor comprising first and second chains laterally spaced along a lateral direction transverse to said forward transport direction, said conveyor comprising a pair of transversely spaced chains traversing around respective upper and lower sprockets in a serpentine manner, a plurality of food product carriers extending transversely between said chains, each of said carriers having a first segment and a second segment, wherein said first and second segments meet at a junction, a plurality of two-piece food product cradles each formed by the second segment of a leading food product carrier and the first segment of a trailing food product carrier immediately therebehind, each of said cradles spanning laterally between and suspended between first and second sides replaceably mounted respectively to said first and second chains wherein said conveyor has a plurality of upwardly traveling flights and a plurality of downwardly traveling flights joined by upper and lower loops around said sprockets, said second segment of said leading food product carrier being separated from said first segment of said trailing food product carrier by a gap, and wherein said food product is carried by both said second segment of said leading food product carrier and said first segment of said trailing food product carrier and spans said gap during designated portions of the travel path of said conveyor wherein each of said food product carriers is L-shaped and has a first leg providing said first segment, and a second leg providing said second segment, said first leg extending substantially horizontally during travel of said conveyor in one of said upwardly traveling flights, said second leg extending substantially vertically during travel of said conveyor in one of said upwardly traveling flights, said first and second legs meeting at said junction, wherein said first leg has a turned first lip at the end of said first leg opposite said junction, said first lip being turned to extend from said first leg in a direction opposite to said second leg such that said first lip extends upwardly during travel of said conveyor in one of said upwardly traveling flights, wherein said second leg has a turned second lip at the end of said second leg opposite said junction, said second lip being turned to extend from said second leg opposite to said first leg such that said second lip extends transversely during travel of said conveyor in one of said upwardly traveling flights.

25. The food product transporter according to claim 24 wherein said first segment has first and second opposite faces, said first face facing forwardly toward the next food product carrier thereahead, said second face facing aft toward the next food product carrier therebehind, said second face meeting said second segment at said junction, and wherein said food product changes position from a first position to a second position as said conveyor travels around a respective one of said loops, said food product in said first position being carried by said second segment and said first face of said first segment and spanning said gap, said food product in said second position being carried by said second segment and said second face of said first segment at said junction.

26. The food product transporter according to claim 25 wherein said food product changes position from said first position to said second position as said conveyor travels around an upper loop around said upper sprockets, and wherein said food product changes position from said second position to said first position as said conveyor travels around a lower loop around said lower sprockets.

27. The food product transporter according to claim 25 wherein said food product in said first position is carried by two of the food product carriers, namely, said second segment of a leading food product carrier and said first face of said first segment of the immediately trailing food product carrier, and wherein said food product in said second position is carried by one of the food product carriers, namely said second segment of said one food product carrier and said second face of said first segment of the same said one food product carrier.

28. The food product transporter according to claim 24 wherein said food product changes between first and second positions as said conveyor traverses through said chamber, said food product in said first position being carried by said second segment of said leading food product carrier and said first segment of said trailing food product carrier and spanning the gap therebetween, said food product in said second position being carried by a single one of said carriers, namely at said junction of said first and second segments of the same said carrier one of said carriers.

29. The food product transporter according to claim 24 wherein said food processing apparatus includes a loading station transferring said food product to said conveyor, and an unloading station transferring said food product from said conveyor, and wherein each said cradle has an opening distally opposite said gap and defining a food product cavity therebetween containing said food product, said opening receiving said food product therethrough at said loading station and discharging said food product therethrough at said unloading station, and wherein the width of said opening varies during traversal of said conveyor from said loading station to said unloading station.

30. The food product transporter according to claim 1 wherein said second segment has first and second distally opposite ends spaced from each other along said forward transport direction, and said second segment defines a rectilinear surface along the entire span between said first and second ends.

31. The food product transporter according to claim 1 wherein said chamber circulates a processing medium therein, and each of said food product carriers is perforated with a plurality of perforations to facilitate circulation of the processing medium therethrough, to maximize contact of the processing medium with said food product, and also to minimize surface contact area of said food product carrier with said food product to in turn minimize touch-marks which are objectionable for final product appearance, and to minimize sticking of said food product to said food product carrier.

32. The food product transporter according to claim 5 wherein said second segment has first and second distally opposite ends spaced from each other along said forward transport direction, and said second segment defines a rectilinear surface along the entire span between said first and second ends.

33. The food product transporter according to claim 5 wherein said chamber circulates a processing medium therein, and each of said food product carriers is perforated with a plurality of perforations to facilitate circulation of the processing medium therethrough, to maximize contact of the processing medium with said food product, and also to minimize surface contact area of said food product carrier with said food product to in turn minimize touch-marks which are objectionable for final product appearance, and to minimize sticking of said food product to said food product carrier.

34. The food product transporter according to claim 24 wherein said second segment has first and second distally opposite ends spaced from each other along said forward transport direction, and said second segment defines a rectilinear surface along the entire span between said first and second ends.

35. The food product transporter according to claim 24 wherein said chamber circulates a processing medium therein, and each of said food product carriers is perforated with a plurality of perforations to facilitate circulation of the processing medium therethrough, to maximize contact of the processing medium with said food product, and also to minimize surface contact area of said food product carrier with said food product to in turn minimize touch-marks which are objectionable for final product appearance, and to minimize sticking of said food product to said food product carrier.

\* \* \* \* \*